United States Patent [19]

Roberts

[11] 4,079,747

[45] Mar. 21, 1978

[54] HIGH TEMPERATURE VALVE

[75] Inventor: Richard Albert Roberts, Hacienda Heights, Calif.

[73] Assignee: Consolidated Controls Corporation, Bethel, Conn.

[21] Appl. No.: 747,243

[22] Filed: Dec. 3, 1976

Related U.S. Application Data

[62] Division of Ser. No. 541,254, Jan. 15, 1975, Pat. No. 4,010,775.

[51] Int. Cl.² ............................................. F16K 27/00
[52] U.S. Cl. ..................................... 137/375; 251/308; 251/368
[58] Field of Search ................. 137/375; 251/308, 368

[56] References Cited

U.S. PATENT DOCUMENTS

| | | | |
|---|---|---|---|
| 3,614,061 | 10/1971 | Fitzpatrick | 251/368 X |
| 3,662,986 | 5/1972 | Domulewicz | 251/368 X |
| 3,701,359 | 10/1972 | Worley | 137/375 X |
| 3,714,971 | 2/1973 | Venable | 138/143 |

*Primary Examiner*—Robert G. Nilson
*Attorney, Agent, or Firm*—Mason, Kolehmainen, Rathburn & Wyss

[57] ABSTRACT

A valve for use with high temperature abrasive fluids includes a valve body having an outer shell of metal, such as low carbon steel, a refractory liner attached to the shell comprising an insulating outer layer of relatively low density castable refractory material, such as alumina, an inner layer of relatively high density castable refractory abrasion resistant material attached to an inner surface of the insulating layer, and a flame sprayed ceramic coating applied to an inner surface of the abrasion resistant castable refractory layer defining a flow passage in the valve body for the passage of fluids. The valve body includes a removable core assembly containing the working parts of the valve.

38 Claims, 10 Drawing Figures

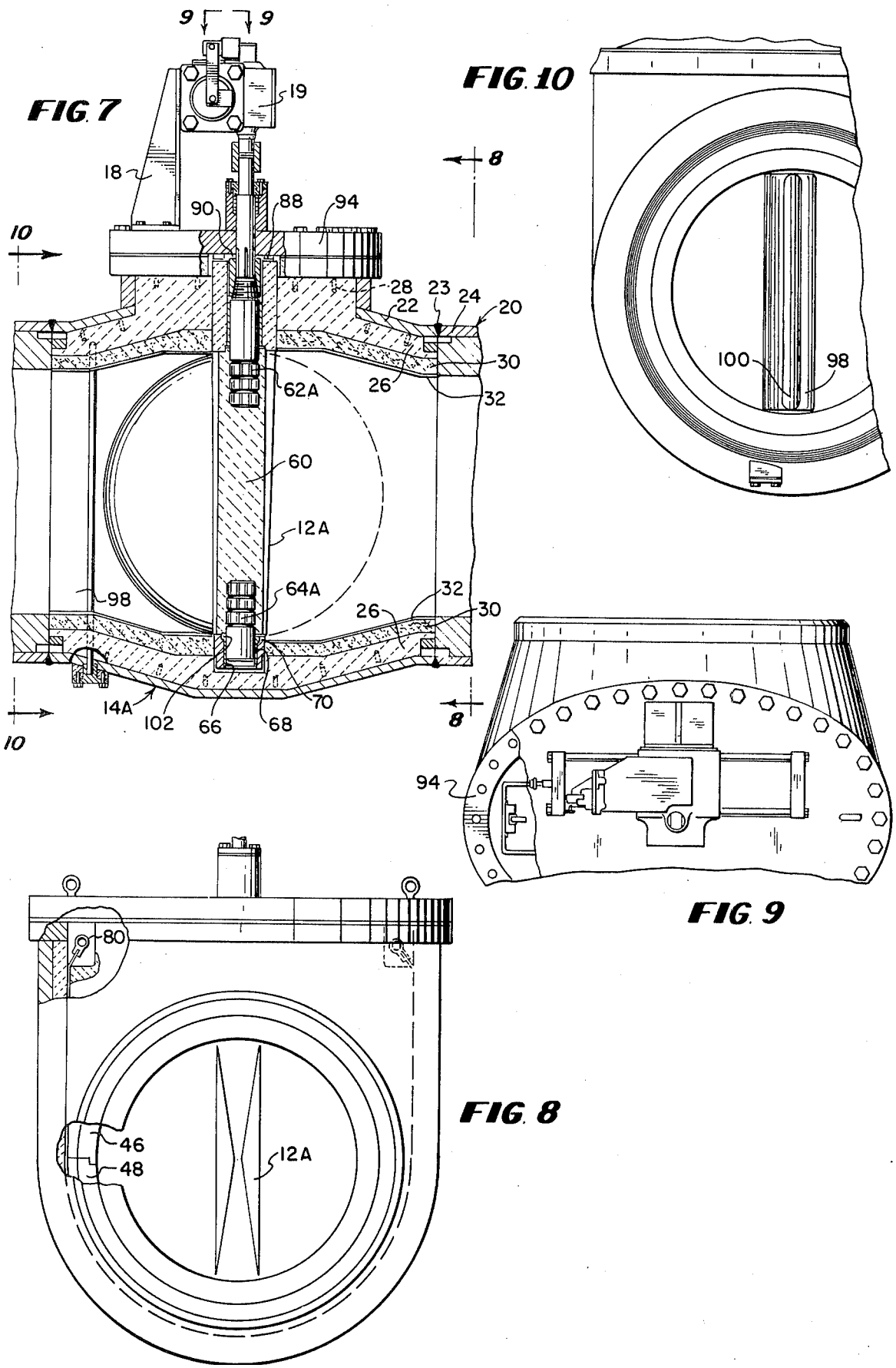

HIGH TEMPERATURE VALVE

BACKGROUND OF THE INVENTION

This application is a division of my copending application Ser. No. 541,254 filed Jan. 15, 1975 and assigned to the same assignee, now U.S. Pat. No. 4,010,775, dated Mar. 8, 1977.

Field of the Invention

This invention relates to a valve for regulating the flow of high temperature, abrasive fluids and more particularly, to a valve constructed primarily from a combination of refractory and ceramic materials for use in regulating the flow of gas and char particles encountered in a coal gasification process.

Description of the Prior Art

It is well known to provide a high temperature valve with a refractory lining as disclosed in the following U.S. Pat. No.: 3,701,359 — Worley et al. It is further known to provide a valve having removable valve elements as disclosed in the following U.S. Pat. No.: 3,726,306 — Purvis Synthetic fuel gas is commonly produced by reacting a carbon source, such as coal, with steam at a high temperature. The process is called coal gasification and the reaction generally is carried out under a reactor pressure of about 550 psig and a temperature in the range of about 1800° F. Hot coal particles are metered into a gasification reactor through a high temperature valve. Another high temperature valve is required at the bottom of the gasification reactor to allow for the flow of gas and an unreacted (char) portion of the coal.

The valves used in the coal gasification apparatus must have high thermal resistance to withstand very high temperatures on the order of about 1800° F. or higher. The valves must also be resistant to abrasion and erosion caused by the hot gases and solid particles, and must have high strength capable of withstanding the pressure differential between reactor and conduit pressure.

High temperature, high cost super-alloy materials are commonly used to fabricate the valves used with coal gasification apparatus, but such materials operate at or near the limit of their physical properties when subjected to temperatures in the range of about 1800° F., and are prohibitively expensive.

SUMMARY OF THE INVENTION

For a valve to be capable of handling hot fluids at a temperature of about 1800° F. containing highly abrasive solid particles, such as char resulting from the coal gasification process, it has been found in accordance with the principles of the present invention that it is necessary to provide the valve with a composite lining containing both refractory and ceramic materials on all parts subjected to direct contact with the hot abrasive fluids. By providing a composite material of refractory and ceramic materials as the primary structural components of the valve assembly, metal parts can be eliminated from the flow environment while providing sufficient flexural strength to meet the requirements of a valve handling high temperature, high pressure gases containing hot abrasive solid particles. A modular design valve having a removable core assembly containing the working parts of the valve is constructed to provide sufficient flexural strength without metal parts within the flow environment.

An object of the present invention is to provide apparatus capable of regulating the flow of high temperature, abrasive fluids having no metal parts disposed within the fluid flow passage.

Another object of the present invention is to provide a high temperature, abrasion resistant valve housing fabricated from low carbon steel coated with a combination of castable refractory and ceramic materials.

Another object of the present invention is to provide a rotatable butterfly disk fabricated from refractory and ceramic materials and having no metal parts.

Another object of the present invention is to provide a high temperature, abrasion resistant fluid valve having a valve housing adapted to be permanently attached in a conduit system and a removable valve assembly removably insertable into the housing so that the working valve parts can be easily removed and replaced without removal of the valve housing.

Another object of the present invention is to provide a valve housing constructed from a combination of a metal support member, a castable refractory insulating material, a castable refractory abrasion resistant material and a ceramic fluid-contacting layer.

Another object of the present invention is to provide a high temperature, abrasion resistant valve having a ceramic butterfly disk shaft connected to a metal drive shaft in such a manner that with thermal expansion of either or both shafts, a shaft coupling can axially move upwardly against a spring bias, to minimize stresses which would otherwise result from thermal expansion.

Another object of the present invention is to provide a high temperature, abrasion resistant valve wherein every surface exposed to a high temperature abrasive fluid is coated with a composite of refractory and ceramic layers.

Another object of the present invention is to provide a valve coated with a layer of refractory and a layer of ceramic each fabricated from the same basic refractory oxide material.

Another object of the present invention is to provide a high temperature, abrasion resistant valve housing having an insulating layer of castable refractory material coated with abrasion resistant materials comprising a layer of castable abrasion resistant refractory material and a flame sprayed layer of ceramic material.

Another object of the present invention is to provide a high temperature, abrasion resistant valve housing having inner layers sufficiently insulating so that a low carbon steel outer shell is sufficiently protected from fluids having temperatures in the range of about 1800° F.

Another object of the present invention is to provide a high temperature, abrasion resistant valve having an inner, fluid-contacting layer of a flame-sprayed ceramic material on all parts exposed to a high temperature abrasive material.

Another object of the present invention is to provide a valve capable of regulating the flow of fluids at about 1800° F. and 550 psig and having a useful life greater than the conduit in which the valve is installed.

Another object of the present invention is to provide a high temperature, abrasion resistant valve capable of top entry installation whereby a core containing the working parts of the valve can be removed without removing the valve housing from the conduit.

Another object of the present invention is to provide a high temperature, abrasion resistant valve capable of regulating the flow of high temperature fluids and solid particles without the need for high cost super-alloy materials.

Another object of the present invention is to provide a high temperature, abrasion resistant valve provided with a plurality of linings having different physical properties while having the same material as the primary refractory oxide component of each lining so that thermal expansion problems will be minimized.

Another object of the present invention is to provide a high temperature, abrasion resistant valve capable of regulating the flow of a gas containing abrasive char particles resulting from the high temperature reaction of carbon with steam in a coal gasification reactor.

Another object of the present invention is to provide a valve housing fabricated from a low cost outer structural member having a lining comprising refractory and ceramic materials so that the outer structural member will be subjected to temperatures of only about 500° F., whereas the fluid passing through the valve has a temperature of approximately 1800° F.

Another object of the present invention is to provide a high temperature abrasion resistant valve adapted for use as a solids handling valve and as a throttling valve (heat exchanger by-pass valve) in the coal gasification process.

Another object of the present invention is to provide a high temperature valve fabricated from large refractory and ceramic structural parts.

Briefly, the device of the present invention comprises a valve body having an outer shell of metal, a refractory liner in said shell comprising an insulating outer layer of relatively low density, light weight castable refractory material adjacent said shell, an inner layer of relatively high density castable refractory material inside said insulating layer, and a flame sprayed ceramic coating applied to an inner surface of said inner layer, said coating defining a flow passage in said body for said fluids.

The valve body is formed with a recess for removably receiving a valve core assembly. The valve core assembly includes a valve core of castable refractory material defining a bore aligned with the flow passage when the assembly is seated in the valve body recess, a valve member of castable refractory material mounted on said valve core for movement to open and close the bore, and a cover assembly supporting said valve member of said core and including an actuating mechanism operable to move the valve member to open and close the bore.

BRIEF DESCRIPTION OF THE DRAWINGS

Other objects and advantages and novel features of the present invention will become apparent from the following detailed description of the preferred embodiments of the present invention as illustrated in the drawings wherein:

FIG. 7 is a partially elevational, partially cross sectional view of an alternate embodiment of the high temperature valve of FIG. 1 constructed in accordance with the principles of the present invention;

FIG. 8 is a partially cutaway end elevational view of the device of FIG. 7 taken from line 8—8 of FIG. 7;

FIG. 9 is a fragmentary, top elevational view of the device of FIG. 7 taken from line 9—9 of FIG. 7; and FIG. 10 is a fragmentary, end elevational view of the device of FIG. 7 taken from line 10—10 of FIG. 7.

DETAILED DESCRIPTION OF THE INVENTION

Figure 1:
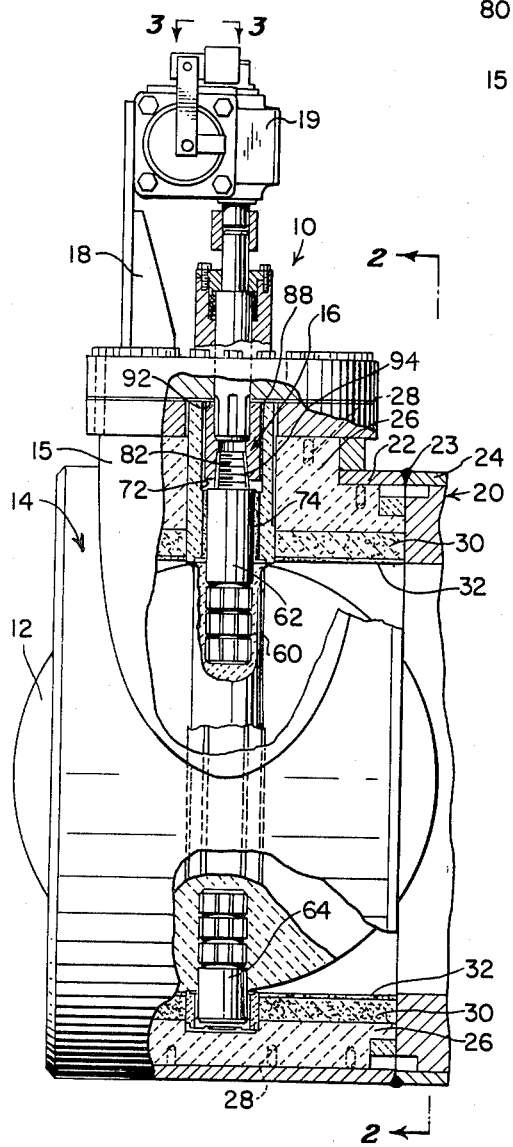
FIG. 1 is a partially cutaway, partially elevational, side view of the high temperature valve constructed in accordance with the principles of the present invention.
Figure 2:
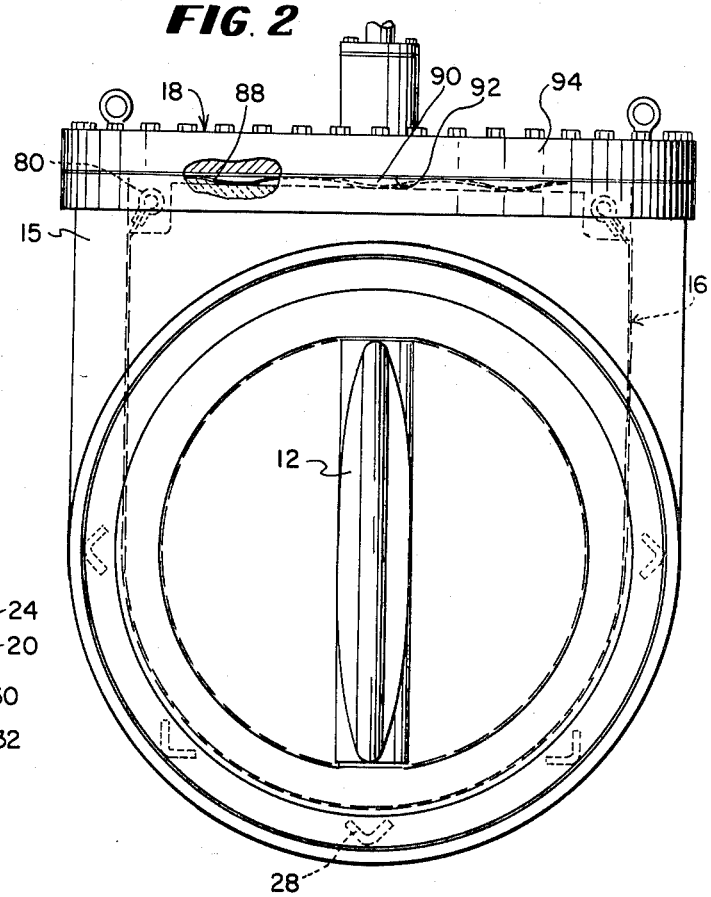
FIG. 2 is a partially cutaway end elevational view of a portion of the device of FIG. 1 taken from line 2—2 of FIG. 1.
Figure 3:
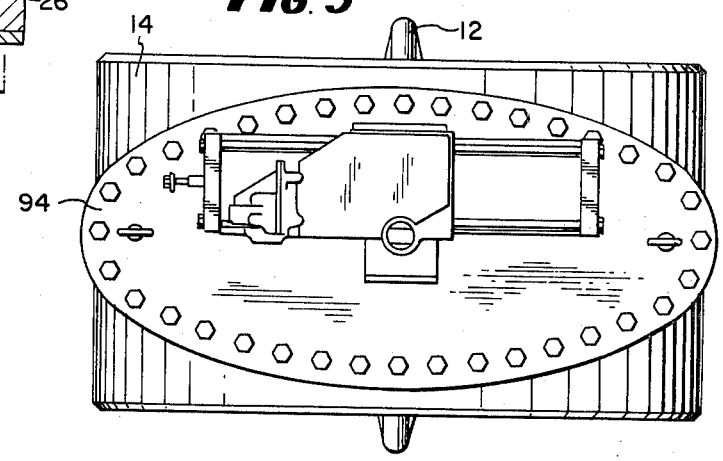
FIG. 3 is a top elevational view of the device of FIG. 1 taken from line 3—3 of FIG. 1.

Referring now to the drawings and more particularly to the embodiments shown in FIGS. 1 to 6, inclusive, there is illustrated a new and improved valve 10 constructed in accordance with the principles of the present invention. The valve 10 is generally illustrated as a butterfly-type valve having a butterfly disk 12 capable of rotating 90° to the completely open and completely closed positions. It should be understood that other valve constructions, such as gate valves and the like, can also be provided with the new and advantageous structural features of the valve described herein.

In accordance with an important feature of the present invention, the valve 10 comprises three major segments, a valve housing 14, having a top opening elliptical portion 15, said housing being adapted to be permanently secured within a conduit system; a valve core assembly 16 (FIGS. 4–6), which is removable from the valve housing 14 and contains the working parts of the valve; and a valve cover assembly 18, formed as an integral unit, for removably securing the core assembly 16 within the valve housing 14. The valve cover assembly contains an actuating mechanism 19 for automatically rotating valve disk 12 between its open and closed positions.

The valve housing 14 is permanently secured to a conduit 20, as by welding the outer metal shell or body member 22 of valve housing 14 to the outer metal shell 24 of conduit 20, as indicated at 23 in FIG. 1. Preferably, conduit 20 should have a refractory lining 21. In accordance with an important feature of the present invention, the valve housing 14 is fabricated from a low cost, low carbon steel outer shell or body member 22, insulated on its inner surface with a plurality of refractory layers providing both heat insulation and abrasion resistance. By providing the metal housing shell 22 with a plurality of refractory layers, the valve housing 14 will have a longer useful life than the conduit 20 and can be permanently secured thereto. More particularly, a first low density, light weight castable refractory layer 26 is cast in place on the interior surface of the metal shell 22 to form a first insulating refractory layer adjacent the shell 22. The insulating refractory layer 26 is cast in any manner known in the art and should be anchored to the shell 22 as with suitable welded anchoring members 28. The particular method of installation and the temperature of drying and setting the refractory material is not critical in making a valve in accordance with the principles of the present invention. Generally, the refractory is cast at room temperature. The insulating refractory material 26 contains at least about 85 percent of a relatively coarse grained refractory oxide such as $Al_2O_3$, $SiO_2$, CaO, MgO, $ZrO_2$, $TiO_2$, $Cr_2O_3$, BeO or a mixture thereof. The preferred castable insulating refractory material is a mixture of Alumina and Silica in a ratio range of 2:3 to 3:2. Preferably, the cast insulating refractory layer 26 should contain about 94 to 97 percent refractory oxide. When such a layer is secured to the metal shell 22 on its inner surface, it provides excellent thermal insulation so that the metal shell 22 can be fabricated from a low cost, low carbon steel and still allow for the passage of fluids having relatively high temperatures. The insulating refractory material 26 should be of a thickness commensurate with the diameter and operating temperature of the valve, for example 3 inches for a 34 inch diameter valve used with an 1800° F. abrasive fluid. Generally, for sufficient insulation, the castable insulating refractory material 26 should have a thermal conductivity of less than about 5.0 BTU/sq. ft./° F./hr. inch thickness over a temperature range up to 2000° F.

The valve housing 14 is also provided with an inner layer of relatively high density, high purity castable abrasion resistant refractory material 30. The abrasion resistant refractory material 30 comprises a refractory oxide material such as $Al_2O_3$, $SiO_2$, CaO, MgO, $ZrO_2$, $TiO_2$, $Cr_2O_3$, or BaO in an amount of at least about 85 percent by weight. In accordance with an important feature of the present invention, it has been found that a castable refractory material containing $Al_2O_3$ in an amount in the range of about 94 to 97 percent by weight provides excellent abrasion resistance and long life to the valve housing 14 described herein. Due to its higher density (more than 100 pounds/ft.$^3$ and preferably more than 150 pounds/ft.$^3$), the castable abrasion resistant refractory material 30 has a higher thermal conductivity than the castable insulating refractory material 26. Preferably, the layer 30 should have a thermal conductivity of less than about 10 BTU/sq. ft./hr./° F./in. thickness over a temperature range of from 400° F. to 2400° F.

Examples of suitable high density, high purity abrasion resistant refractory materials 30 are Greencast-97 and Greencast-94 manufactured by A. P. Green. Greencast-97 contains 97% $Al_2O_3$, has a density of 153 pounds/cu. ft., and a thermal conductivity in the temperature range up to 2000° F. of 9.0–10.0 BTU/sq. ft./° F./in thickness. Greencast-94 contains 94% $Al_2O_3$, has a density of 163 pounds/cu. ft., and a thermal conductivity in the temperature range up to 2000° F. of 9.5 to 10.5 BTU/sq. ft./hr./in. thickness.

The castable refractory material 30 is cast in place over the insulating refractory material in any suitable manner known in the art of installing refractories. Again, the particular method of installation and the temperature of drying and setting the abrasion resistant refractory material 30 is not critical in making a valve in accordance with the principles of the present invention. Generally, the refractory material 30 is set at room temperature. The layer 30 has a thickness somewhat less than the insulating refractory layer 26, for example, 2 inches thick on a 34 inch O.D. conduit handling a 1800° F. abrasive fluid.

In accordance with an important feature of the present invention, the inner layer of abrasion resistant refractory material 30 is coated with a thin layer of flame sprayed ceramic material 32 in a thickness of about 20 to 100 mils. This thin layer 32 of ceramic material fills in the voids in the surface of the layer 30 and provides an inner surface for the valve housing 14 which is extremely smooth and wear resistant when abrasion materials pass through the conduit 20. The ceramic materials contain more finely grained refractory oxide than the refractory materials. Preferably, the ceramic material 32 should be of the same composition as the layer 30 so that thermal stresses do not result between these layers. For example, it has been found that a layer 32 of flame sprayed 99.9% by weight $Al_2O_3$ increases the life expectancy of the valve housing 14 to approximately ten times its life expectancy without such a ceramic coating. It has been found that by flame spraying the ceramic material 32 over the abrasion resistant refractory 30, the ceramic will tenaciously bond to the refractory and smooth the surface by filling in the voids in the refractory surface. The flame sprayed ceramic coating will thereby provide better sealing surfaces in addition to increasing the strength and abrasion resistance of the valve housing 14. The ceramic material can be flame sprayed in any known manner, for example, by metallizing, thermal spray, or plasma flame methods. Each of these methods is well known as set forth in the literature, for example, in an article "The Metco Flame Spraying Processes", 1967, bulletin 136C, Metco, Inc., pages 1–12. Any of these common flame spraying processes can be used to apply the flame sprayed ceramic coating 32. The flame sprayed ceramic material should contain at least about 90 percent by weight of a refractory oxide such as $Al_2O_3$, $SiO_2$, CaO, MgO, $ZrO_2$, $TiO_2$, $Cr_2O_3$ or BeO. It is preferred to employ a high purity ceramic containing at least about 96 percent of a refractory oxide. Typical commercial ceramics include Alumina, Silica, Zirconia, Mullite, Steatite and Forsterite. Properties of typical useful high purity Alumina ceramic materials manufactured by Coors Ceramics containing more than 99% $Al_2O_3$, are AD-995, AD-999, and Vistal ® as described in Table I:

TABLE I

| PROPERTY | | UNITS | TEST | AD-995 99.5% $Al_2O_3$ | AD-999 99.9% $Al_2O_3$ | VISTAL® 99.9% $Al_2O_3$ | AD-96 96% $Al_2O_3$ |
|---|---|---|---|---|---|---|---|
| SPECIFIC GRAVITY | | | ASTM C20-70 | 3.19 | 3.96 | 3.99 | 3.72 |
| HARDNESS | Rockwell | R45N | ASTM E18-67 | 83 | 90 | 85 | 78 |
| SURFACE FINISH | As-Fired | Microinches (arithmetic average) | Profilometer (0.030" cutoff) | 35 | 20 | 25 | 65 |
| CRYSTAL SIZE | Range | Micrometers | | | 5-0 | 1-6 | 15-45 | 2-20 |
| | Average | | | 17 | 3 | 20 | 11 |
| WATER ABSORPTION | | | ASTM C373-56 | NONE | NONE | NONE | NONE |
| GAS PERMEABILITY | | | | NONE | NONE | NONE | NONE |
| COMPRESSIVE | 25° C | psi | ASTM C528-63T | 360,000 | 550,000 | 370,000 | 300,000 |
| STRENGTH | 1000° C | | | — | 280,000 | 70,000 | — |
| FLEXURAL | Typical, 25° C | psi | ACMA TEST #2 | 55,000 | 80,000 | 41,000 | 52,000 |
| STRENGTH | Minimum, 25° C | | | — | 75,000 | — | 47,000 |
| | Typical, 1000° C | | | — | 60,000 | 25,000 | 25,000 |
| | Minimum, 1000° C | | | — | 55,000 | — | 20,000 |

TABLE I-continued

| PROPERTY | | UNITS | TEST | AD-995 99.5% $Al_2O_3$ | AD-999 99.9% $Al_2O_3$ | VISTAL® 99.9% $Al_2O_3$ | AD-96 96% $Al_2O_3$ |
|---|---|---|---|---|---|---|---|
| TENSILE | 25° C | psi | ACMA TEST #4 | 38,000 | 45,000 | 30,000 | 28,000 |
| STRENGTH | 1000° C | | | — | 32,000 | 15,000 | 14,000 |
| MODULUS OF ELASTICITY | | psi | ASTM C623-69T | $54 \times 10^6$ | $56 \times 10^6$ | $57 \times 10^6$ | $44 \times 10^6$ |
| SHEAR MODULUS | | si | | $22 \times 10^6$ | $23 \times 10^6$ | $23.5 \times 10^6$ | $18 \times 10^6$ |
| BULK MODULUS | | psi | | $33 \times 10^6$ | $33 \times 10^6$ | $34 \times 10^6$ | $25 \times 10^6$ |
| TRANSVERSE SONIC VELOCITY | | m/sec. | | $9.8 \times 10^3$ | $9.9 \times 10^3$ | $9.9 \times 10^3$ | $9.1 \times 10^3$ |
| POISSON'S RATIO | | | | 0.22 | 0.22 | 0.22 | 0.21 |
| MAXIMUM USE TEMPERATURE | No-Load Conditions | ° C | | 1750 | 1900 | 1900 | 1700 |
| COEFFICIENT OF LINEAR THERMAL EXPANSION | −200 to 25° C | $10^{-4}$/degree C. | ASTM C372-56 | 3.4 | 3.4 | 3.4 | 3.4 |
| | 25 to 200° C | | | 7.1 | 6.5 | 5.5 | 6.0 |
| | 25 to 500° C | | | 7.6 | 7.4 | 7.4 | 7.4 |
| | 25 to 800° C | | | 8.0 | 7.8 | 7.8 | 8.0 |
| | 25 to 1000° C | | | 8.3 | 8.0 | 8.0 | 8.2 |
| | 25 to 1200° C | | | — | 8.3 | 8.3 | 8.4 |
| THERMAL CONDUCTIVITY | 20° C | g-cal/ (sec.) ($cm^2$) (° C/cm) | ASTM C408-58 | 0.085 | 0.093 | 0.095 | 0.059 |
| | 100° C | | | 0.062 | 0.066 | 0.068 | 0.045 |
| | 400° C | | | 0.029 | 0.032 | 0.032 | 0.024 |
| | 800° C | | | 0.015 | 0.015 | 0.015 | 0.013 |
| SPECIFIC HEAT | 100° C | g-cal/g/° C | ASTM C351-61 | 0.21 | 0.21 | 0.21 | 0.21 |

Figure 4:
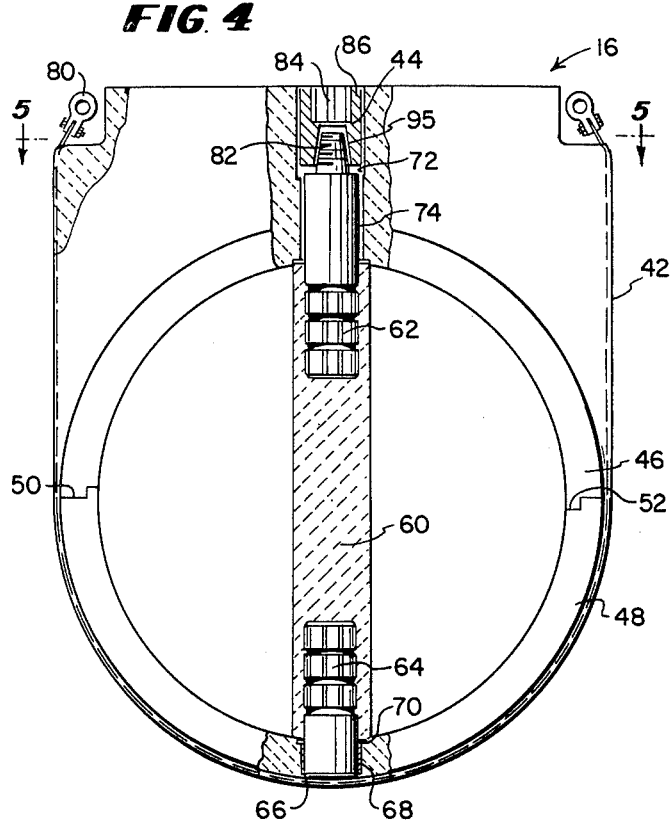
FIG. 4 is a partially cutaway cross sectional view of a portion of the device of FIG. 1 taken along line 4—4 of FIG. 6.
Figure 5:
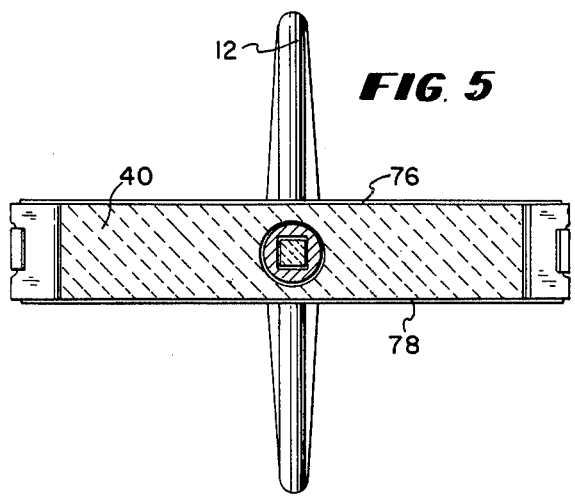
FIG. 5 if a top elevational view of a portion of the device of FIG. 1 taken from line 5—5 of FIG. 4.
Figure 6:
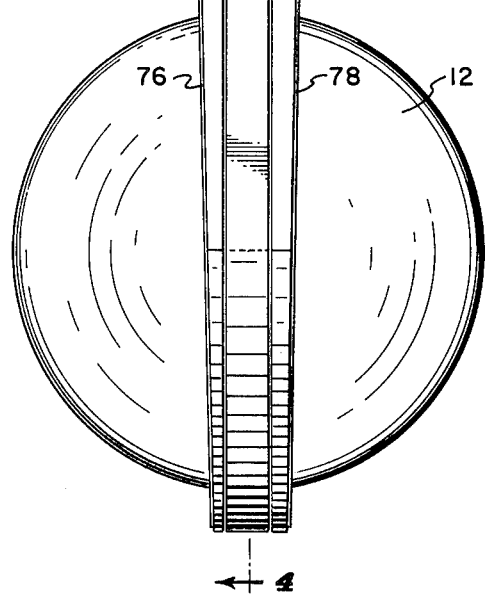
FIG. 6 is a side elevational view of a portion of the device of FIG. 1.

As best shown in FIGS. 4, 5 and 6, the valve core assembly 16 includes the butterfly disk 12, a core 40, a lifting strap 42, and a drive shaft coupling 44. The valve core 40 is fabricated from a high purity (94 to 97 percent by weight refractory oxide) ceramic material and is made in two parts, an upper core member 46 and a lower semi-cylindrical core member 48. The upper core member 46 and lower core member 48 of core 40 are keyed to fit together as indicated at 50 and 52 in FIG. 4.

The butterfly disk 12 is fabricated from a castable refractory material 60 and contains an upper ceramic shaft member 62 and a lower ceramic shaft member 64 embedded therein in axial alignment. The shaft members 62 and 64 are fabricated from a high purity ceramic material such as those materials used in flame spraying the layer 32, as described heretofore. The shaft members 60 and 62 are fluted and grooved to provide a solid connection to the disk 12. Butterfly disk 12 is fabricated by casting the castable refractory material 60 around the axially aligned shaft members 62 and 64 to provide a one piece disk 12. It is preferred to structually reinforce the refractory material 60 with ceramic rods (not shown).

In accordance with an important feature of the present invention, the butterfly disk 12 is fabricated from a high purity castable refractory material containing a refractory oxide in an amount of about 94 to 97 percent by weight. It has been found that a castable alumina refractory material containing 94 to 97 percent by weight $Al_2O_3$ is suitable for the fabrication of butterfly disk 12. The refractory material 60 can be fired on the job by the hot gas and solid particles passing through the valve, but to achieve maximum flexural strength in butterfly disk 12, it should be fired at a temperature above the temperature of the material passing through the valve, for example, about 1800° F. Typical suitable alumina castable refractory materials containing 94–97 percent by weight $Al_2O_3$ have the physical properties set forth in Table II:

TABLE II

| | NO. 1 | NO. 2 | NO. 3 |
|---|---|---|---|
| Minimum Use Temperature - ° F | 2900 | 3400 | 2900 |
| Permanent Linear Change - % | | | |
| 1500° F | .1 to .3 | −.10 | .06 |
| 2000° F | .1 to .3 | −.35 | .08 |
| 2500° F | .1 to .3 | −.10 | .095 |
| Modulus of Rupture - psi | | | |
| Ambient | 1200–1800 | 3000–3400 | 3300 |
| 1500° F | 1000–1500 | 2900–3300 | 2400 |
| 2000° F | 1000–1500 | 2600–3000 | 3500 |
| 2500° F | 9000–14,000 | 3000–3400 | 2400 |
| Compressive Strength - psi | | | |
| Ambient | 5000–7500 | 10,000–13,000 | 9000–14,000 |
| 1500° F | 4500–7000 | 9000–12,000 | 9000–14,000 |
| 2000° F | 4000–6000 | 9000–12,000 | 9000–14,000 |
| Thermal Conductivity BTU/Ft.$^2$/hr./° F/in. Thickness | | | |
| 1500° F | 9.5 | 9.15 | 17. |
| 2000° F | 9.7 | — | 17. |

In accordance with an important feature of the present invention, the castable refractory material 60 of butterfly disk 12 is flame sprayed with a thin layer of a high purity ceramic material having a thickness of about 20 to 100 mils. Typical suitable high purity ceramic materials useful in coating disk 12 are for example $Al_2O_3$, $SiO_2$, CaO, MgO, $ZrO_2$, $TiO_2$, $Cr_2O_3$, or BeO. Some specific examples of high purity alumina flame spraying materials have been described with reference to the Table I (AD-995, AD-999 and Vistal ®).

The lower shaft member 64 of butterfly disk 12 is supported in a bore 66 made in the lower portion 48 of valve core 40. A ceramic bearing 68 inserted within bore 66 and a ceramic washer 70 disposed around shaft member 64 provide for sufficient rotational movement of lower shaft member 64 within core 66. The ceramic bearing 68 and ceramic washer 66 are made from high purity refractory materials such as those compositions described with reference to flame spraying and should be of the same refractory oxide as that of ceramic shaft member 64. A portion of upper ceramic shaft member 62 extends into a bore 72 made in upper core member 46. The bore 72 is lined with a ceramic bearing 74 fabricated from the same high purity refractory oxide as shaft member 62 to provide for sufficient rotational movement of upper shaft member 62 for opening and closing of valve 10.

In accordance with an important feature of the present invention, it has been found that the valve core 40 is advantageously fabricated from an alumina ceramic material containing about 94 to 97 percent alumina. For example, a ceramic material manufactured by Coors Ceramics (AD-96) containing 96 percent alumina is useful in the fabrication of core 40 (see Table I for properties). The valve core 40 should have a slight taper from top to bottom, as best shown in FIG. 6, to provide for ease of insertion and removal of core 40 from the top of valve housing 14. Tapered sealing lands 76 and 78 are provided on adjacent surfaces of the valve core 40 to insure good mechanical interlocking of the valve core assembly 16 into valve housing 14. The interior diameter of valve core 40 and the tapered interlocking surfaces 76 and 78 are flame sprayed with high purity ceramic material, as described heretofore with reference to Table I, to provide smooth, abrasion resistant surfaces and to aid in achieving a good mechanical fit of core 40 into housing 14.

After the disk 12 has been inserted into position within the lower core member 48, the upper core member 46 and lower core member 48 of core 40 are brought together and secured into position by tightening lift strap 42.

The lifting strap 42 is fabricated from a suitable strong, flexible material such as steel and is recessed into the outer perimeter of the valve core 40. The lifting strap 42 is connected at its ends to a pair of lifting lugs 80 used to tighten the strap 42 and thereby securely join upper core member 46 and lower core member 48 around disk 12.

Ceramic shaft member 62 is provided with a tapered connection portion 82 formed as an integral part of the upper shaft member 62, and is connected to a metal actuator drive shaft 84 by metal drive shaft coupling 44. An upper annular surface 86 of shaft coupling 44 is spring biased against a flat-wave retaining spring 88. A space 90 is provided between the upper surface 86 of shaft coupling 44 and lower surface 92 of cover plate 94. The wave retaining spring 88 is positioned within space 90 to spring bias shaft coupling 44 in position. It is an important feature of the present invention that space 90, in conjunction with wave spring 88, allows for the upward movement of coupling 44 to allow for thermal expansion during use. Thermal stresses in the valve 10 will thereby be minimized.

The coupling 44 engages the tapered portion 76 of upper ceramic shaft 62 through a tapered spline designed specifically to accommodate the ceramic loading requirements of upper shaft 62. It is an important feature of the present invention that the connection between metal actuator drive shaft 78 and tapered portion 76 of ceramic shaft 62 allows for both radial and axial differential expansion between ceramic shaft 62 and steel coupling 44. The steel coupling 44 is lined with a spacing member 94 fabricated from a suitable heat resistant material such as asbestos. Spacing member 94 prevents the tapered ceramic portion 82 of upper ceramic shaft 62 from directly engaging the metal shaft coupling 44.

In accordance with the embodiment shown in FIGS. 7-10, inclusive, disk 12A is provided with eccentrically disposed shaft portions 62A and 64A and a teardrop shaped guard member 98 is disposed on the upstream side of the disk. The guard member 98 is disposed on the upstream side of disk 12A to protect its sealing surfaces from the abrasive direct impingement with abrasive fluid when in the open position. A replaceable wear rod 100 is disposed on the leading edge of the guard member 98. The valve of FIGS. 7-10 is intended as a shut off (start up) valve for char flow and must therefore seal in the closed position unlike the throttling valve of FIGS. 1-6. The valve of FIGS. 7-10 is fabricated from the same materials as the valve of FIGS. 1-6.

The eccentrically disposed shaft members 62A and 64A provide transtational movement as well as rotational movement in the last 5° of closing to seat the disk 12A against a spherical seat 102. The valve housing 14A is increased in size to minimize the pressure drop across the valve. The disk rotates into seat 102 with final seating being applied like a plug valve by loading the disk axially into the seat. The disk 12A is shaped to meet the valve seat 102 whereby the sealing surface is protected from direct impingement by abrasive solid particles.

What is claimed and desired to be secured by Letters Patent of the United States is:

1. A valve for use with high temperature abrasive fluids comprising a valve body having an outer shell of metal, a refractory liner in said shell comprising an insulating outer layer of relatively low density, light weight castable refractory material adjacent said shell, an inner layer of relatively high density castable refractory material inside said insulating layer, and a flame sprayed ceramic coating applied to an inner surface of said inner layer, said coating defining a flow passage in said body for said fluids.

2. The valve as set forth in claim 1 wherein said valve body is formed with a recess for removably receiving a valve core assembly, a valve core assembly comprising a valve core of castable refractory material defining a bore aligned with said flow passage when said assembly is seated in said recess, a valve member of castable refractory material mounted on said valve core for movement to open and close said bore, and means supporting said valve member on said core and operable to move said valve member to open and close said bore.

3. The valve as set forth in claim 2 wherein said recess in said valve body includes a pair of spaced apart surfaces generally transverse of said flow passages and slightly divergent toward an open end of said recess defined by an opening on one side of said shell, said surfaces having portions thereof formed by said refractory liner inwardly of said shell, said valve core having planar spaced apart opposite side surfaces divergent toward an outer end the core for seating against said portions of said recess surfaces of said valve body.

4. The valve as set forth in claim 2 wherein said valve member comprises a rotatable butterfly disk formed in one piece of castable refractory material and having a coating of flame sprayed ceramic material applied to the surface thereof.

5. The valve as set forth in claim 4 wherein said supporting means includes a pair of axially aligned shafts on opposite edges of said disk formed of alumina ceramic material and embedded in the castable refractory material of said disk.

6. The valve as set forth in claim 5 wherein said valve core is formed with a pair of axially aligned hollow sleeve bearings on opposite sides of said bore for receiving said shafts on said butterfly disk, said bearings formed of alumina ceramic material.

7. The valve as set forth in claim 6 wherein said valve core is formed by a pair of core members, each core member having a portion of its surface defining a portion of said bore and keyed to interfit with the other core member, and one of said bearings mounted in each of said core members.

8. The valve of claim 2 wherein said valve core comprises a pair of core members keyed to interfit and each core member having a surface portion defining a portion of said bore, and metal lift means in contact with outer edge portions of said core members for removing said valve core assembly from said recess in said valve body.

9. A valve housing closure for contact with high temperature fluids and the like comprising a body formed of castable refractory material, an outer layer of flame sprayed ceramic material on said body and one or more stress receiving body supporting members, said body being cast around said members with at least a portion of said members within the body.

10. The valve housing closure of claim 9 wherein at least one of said body supporting members is formed of a ceramic material.

11. The valve housing closure of claim 10 wherein said body supporting member is formed of a high purity alumina ceramic material.

12. The valve housing closure of claim 9 wherein at least one of said body supporting members comprises an axle pin having an outer portion extending outwardly of said body.

13. The valve housing closure of claim 12 wherein said portion cast in place in said body is formed with alternate lands and grooves, said castable refractory filling said grooves of said body supporting members in said grooves.

14. The valve housing closure of claim 9 wherein said body comprises a high purity castable refractory having 94–97% by weight $Al_2O_3$.

15. A valve-type housing for the conveyance of abrasive fluids comprising an outer shell of metal and a plurality of layers of refractory material covering an inner surface of said metal, said refractory layers comprising a layer of abrasion resistant castable refractory material having indentations in an inner surface thereof, and a layer of ceramic material flame sprayed over the inner surface of the abrasion resistant refractory material to at least partially fill said indentations and to smooth said abrasion resistant refractory inner surface thereby providing an abrasion resistant inner surface of said valve housing for smooth sealing surfaces.

16. A valve type housing as defined in claim 15 further including a layer of insulating castable refractory material secured to the inner surface of said metal shell, said insulating castable refractory material covered on its inner surface by said abrasion resistant castable refractory material.

17. A valve-type housing as defined in claim 16 wherein said layer of insulating castable refractory material contains about 94–97% by weight refractory oxide.

18. An abrasion resistant valve-type housing having smooth sealing surfaces for adjusting the flow of high temperature abrasive fluids comprising an outer shell of metal, an outer liner of insulating refractory material secured to an inside surface of said metal shell, a central liner of castable refractory material cast in place over an inside surface of said outer liner, and a flame sprayed inner liner of ceramic material on an inside surface of said central liner to provide a smooth inner surface of said valve housing for mating with movable valve parts.

19. An abrasion resistant valve-type housing as defined in claim 18 including anchor means secured to said inside surface of said metal shell and projecting into said outer liner for securing said central liner in place in said shell.

20. An abrasion resistant valve-type housing as defined in claim 18 wherein said outer liner is cast in place on said inside surface of said metal shell.

21. An abrasion resistant valve-type housing as defined in claim 18 wherein said anchor means comprises a plurality of anchors secured to said shell at spaced apart locations.

22. An abrasion resistant valve-type housing as defined in claim 18 wherein said anchors are secured to said shell by welding.

23. An abrasion resistant valve-type housing as defined in claim 18 wherein said anchors include a pair of divergent legs extending away from said inside surface of said shell.

24. An abrasion resistant valve-type housing as defined in claim 18 wherein said anchors comprise V-shaped elements having an apex thereof welded to said inside surface of said shell.

25. An abrasion resistant valve-type housing as defined in claim 18 wherein said outer liner comprises 94–97% weight refractory oxide material.

26. An abrasion resistant valve-type housing as defined in claim 18 wherein said outer liner comprises at least 85% by weight relatively coarse grained refractory oxide.

27. An abrasion resistant valve-type housing as defined in claim 18 wherein said outer liner comprises a mixture of alumina and silica in a weight ratio in the range of 2:3 to 3:2.

28. An abrasion resistant valve-type housing as defined in claim 18 wherein said central liner of castable refractory materials has a lower density and a lower thermal conductivity than said outer liner of castable refractory material.

29. An abrasion resistant valve-type housing as defined in claim 18 wherein said central liner of castable refractory material has a thermal conductivity less than 10 B.T.U./sq. f./hr./° F./in. thickness.

30. An abrasion resistant valve-type housing as defined in claim 18 wherein said central liner of castable refractory material comprises at least 85% by weight refractory oxide material and has a density of at least 100 pounds/cu. ft.

31. An abrasion resistant valve-type housing as defined in claim 18 wherein said outer liner of castable refractory material has a thermal conductivity less than about 5.0 B.T.U./sq. ft./° F./hr./in. thickness.

32. An abrasion resistant valve-type housing as defined in claim 18 wherein said outer liner of castable refractory material comprises 94–97% refractory oxide.

33. An abrasion resistant valve-type housing as defined in claim 18 wherein said flame sprayed ceramic inner liner contains refractory oxide particles of finer average grain size than refractory oxide particles of either said central liner or of said outer liner.

34. An abrasion resistant valve-type housing as defined in claim 18 wherein said flame sprayed ceramic inner liner comprises at least 90% refractory oxide.

35. An abrasion resistant valve-type housing as defined in claim 34 wherein said inner liner comprises at least 96% refractory oxide.

36. An abrasion resistant valve-type housing as defined in claim 35 wherein said inner liner comprises at least 99% refractory oxide.

37. An abrasion resistant valve-type housing as defined in claim 35 wherein said refractory oxide comprises 99.9% refractory oxide.

38. An abrasion resistant valve-type housing as defined in claim 37 wherein said refractory oxide comprises $Al_2O_3$.

* * * * *